United States Patent [19]

Cecil et al.

[11] Patent Number: 4,713,857
[45] Date of Patent: Dec. 22, 1987

[54] APPARATUS FOR USE IN CLEANING THE TAPE OF A TAPE CASSETTE

[75] Inventors: Don R. Cecil, Gwent, Great Britain; Richard P. Evans, Wavre, Belgium

[73] Assignee: Pacefault Limited, Gwent, England

[21] Appl. No.: 937,826

[22] Filed: Dec. 4, 1986

[51] Int. Cl.⁴ ............................................ B08B 11/02
[52] U.S. Cl. ................................. 15/97 R; 15/100; 360/128; 360/137; 242/188
[58] Field of Search ............... 15/97 R, 100, 21 B, 15/308; 360/137, 128; 242/188, 189

[56] References Cited

U.S. PATENT DOCUMENTS

| 4,324,014 | 4/1982 | Stutz, Jr. et al. | 15/100 X |
| 4,492,993 | 1/1985 | Otis | 242/188 X |
| 4,514,777 | 4/1985 | Kudo | 360/128 |
| 4,635,876 | 1/1987 | Hosilyk et al. | 15/100 X |
| 4,637,088 | 1/1987 | Badaracco et al. | 15/97 R |

FOREIGN PATENT DOCUMENTS 0163252  8/1985  Japan .................................. 360/137

Primary Examiner—Harvey C. Hornsby
Assistant Examiner—Kim O'Leary
Attorney, Agent, or Firm—Marshall, O'Toole, Gerstein, Murray & Bicknell

[57] ABSTRACT

Apparatus for use in cleaning the tape of a tape cassette comprises: a housing; an aperture defined by the housing whereby a tape cassette can be inserted into the housing; an opening defined by the housing through which a tape cleaning device can be inserted into the housing; drive means in the housing for causing the tape of a tape cassette inserted into the housing to be driven past the cleaning device in contact therewith to be cleaned; and electronic logic control circuitry in the housing for controlling the drive means in response to insertion of a cleaning device and a tape cassette.

12 Claims, 10 Drawing Figures

APPARATUS FOR USE IN CLEANING THE TAPE OF A TAPE CASSETTE

The present invention relates to apparatus for use in cleaning the tape of a tape cassette.

According to the present invention, there is provided apparatus for use in cleaning the tape of a tape cassette, the apparatus comprising:

(a) a housing;

(b) an aperture defined by the housing whereby a tape cassette can be inserted into the housing;

(c) an opening defined by the housing through which a tape cleaning device can be inserted into the housing;

(d) drive means in the housing for causing the tape of a tape cassette inserted into the housing to be driven past the cleaning device in contact therewith to be cleaned; and (e) electronic logic control circuitry in the housing for controlling the drive means in response to insertion of a cleaning device and a tape cassette.

According to a preferred example, the housing includes switch means actuated in response to insertion of a cassette into the housing to cause the control circuitry to actuate and control the drive means and means for locking the cleaning device in response to its insertion into the housing. The locking means comprises a solenoid actuated in response to insertion of the cleaning device into the housing, the latter including switch means actuated in response to insertion of the cleaning device into the housing to actuate the solenoid. The drive means comprises a motor and a drive roller driven by the motor and the apparatus is for use with a tape cassette whose tape has means adjacent opposite ends of the tape for indicating these ends, the apparatus including detecting means connected with the control circuitry for sensing the indicating means, the control circuitry controlling the drive means so that at least the portion of tape between the indicating means is driven past the cleaning device. More particularly, the apparatus is for use with a tape cassette in which the indicating means comprises: a first hole in the tape, adjacent one end, and a sequence of holes of a first type between said one end and said first hole; and a second hole in the tape, adjacent the opposite end, and a sequence of holes of a second type between said opposite end and said second hole, the detecting means comprising means for sensing such holes in the tape and the control circuitry controlling the drive means so that the tape is driven in an appropriate direction until a hole in said sequence of a first type is detected, in response to which said drive means drives the tape in the opposite direction until a hole in said sequence of a second type is detected, in response to which the drive means is stopped. The detecting means comprises opto-electronic detecting means.

The present invention will now be described, by way of example, with reference to the accompanying drawings, in which.

Figure 4A:
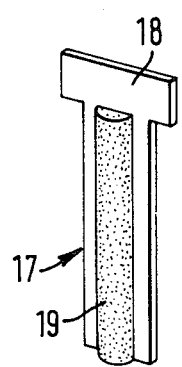
Figure 4B:
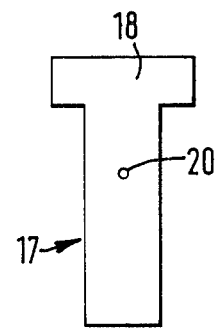
Figure 4C:
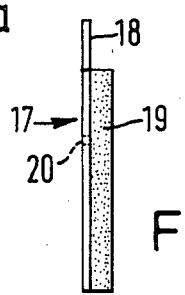
Figure 5:
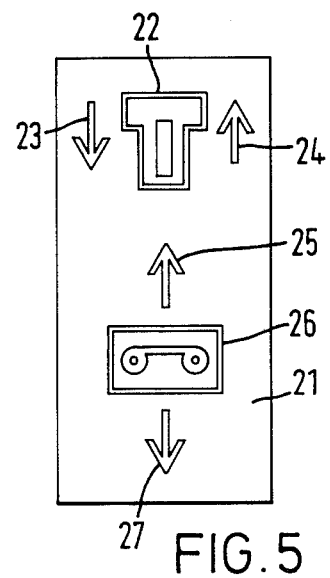
Figure 8:
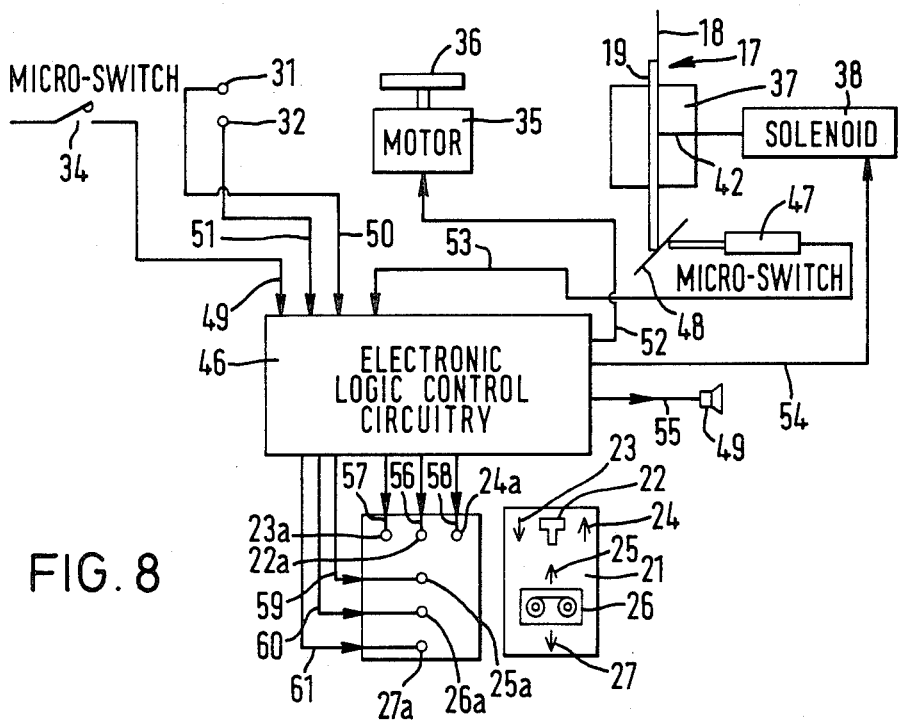
Figure 6:
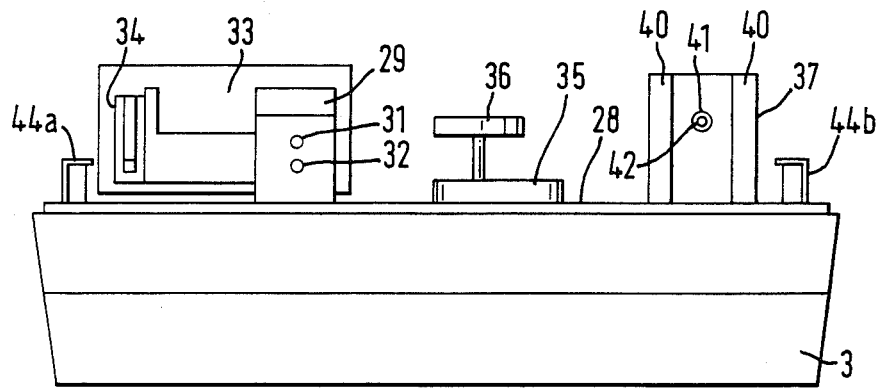
Figure 7:
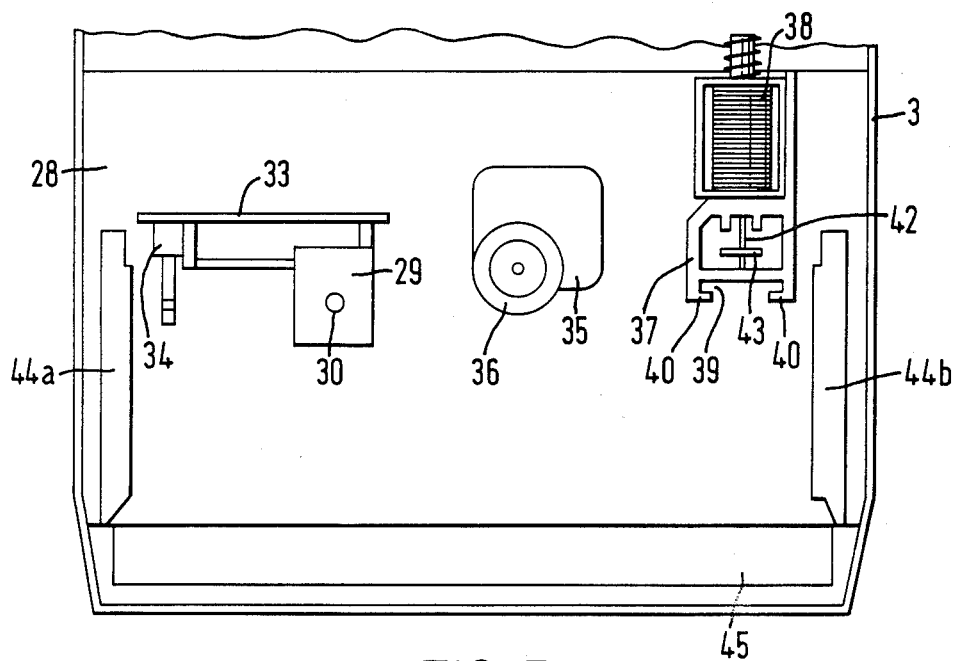

FIGS. 4(a), 4(b) and 4(c) are perspective, rear and side views of a tape cleaning device;

FIG. 5 shows a display area of the apparatus;

FIGS. 6 and 7 show from the front and above part of the inside of the apparatus; and FIG. 8 is a schematic illustration of various elements of the apparatus showing how they are interconnected, for use in explaining the operation of the apparatus.

Figure 1:
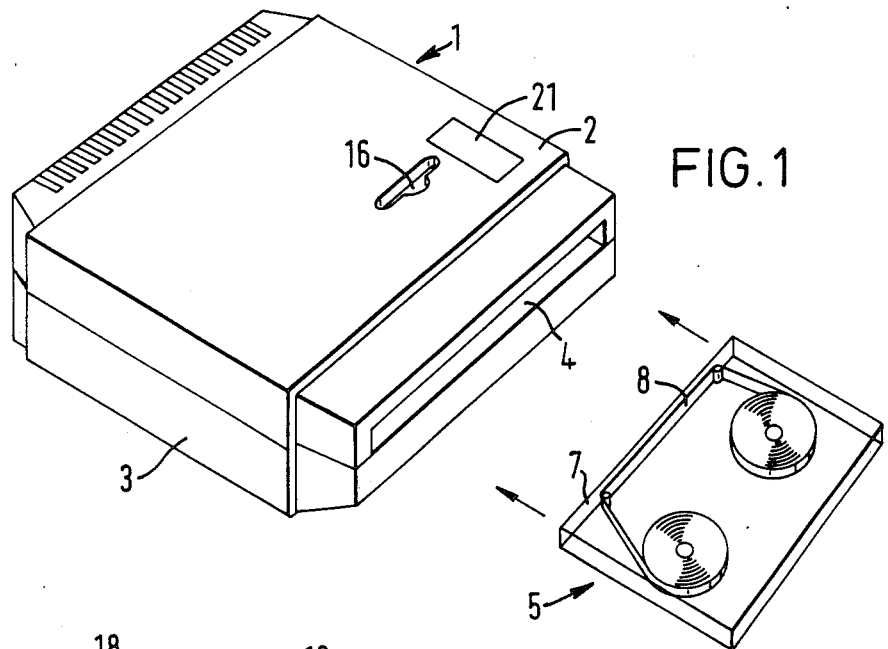
FIG. 1 is a perspective view of apparatus according to a preferred example.

Referring first FIG. 1, apparatus 1 for use in cleaning the tape of a computer tape cassette comprises a pair of moulded portions 2 and 3 of plastics material which fit together by snap-action to provide a manually portable housing having an aperture defined by the portions 2 and 3. In use of the apparatus, a computer tape cassette is pushed into the housing via the aperture 4 in the direction of the arrows in FIG. 1 in the same manner as such a cassette is inserted into an aperture of a computer for read/write operations - reference numeral 5 denoting a schematically illustrated computer tape cassette.

Figure 2:
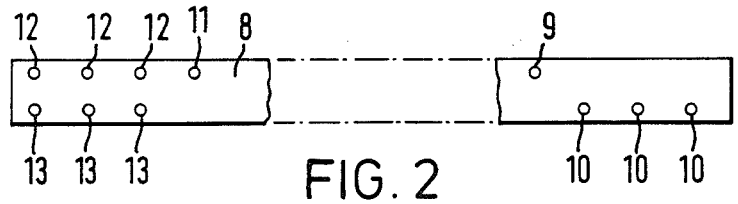
FIG. 2 shows a length of tape of a cassette tape.

Computer tape cassette 5 is a reel-to-reel tape cassette and is of the type in which the tape is driven via an endless drive band which contacts the two reels, the drive band running over a pair of rollers in the cassette and the shaft of a capstan, which capstan is exposed through an open portion of the leading edge 7 of the cassette. The drive band is itself driven to drive the tape by rotation of the capstan. Also, referring to FIG. 2, the tape 8 of the cassette has means for indicating the "end" and the "beginning" of the tape. The means for indicating the "end" of the tape comprises a hole 9 at the top of the tape and near the "end" of the tape, the hole 9 being followed by a row of holes 10 at the bottom of the tape and leading towards the actual "end" of the tape. The means for indicating the "beginning" of the tape comprises a hole 11 at the top of the tape and near the "beginning" of the tape, the hole 11 being preceded by a row of holes 12 at the top of the tape overlying respective ones of a row of holes 13 at the bottom of the tape, and leading towards the actual "beginning" of the tape. In use of the computer tape cassette, the usable portion of the tape 8 is the portion between holes 9 and 11 and the example of apparatus according to the present invention being described ensures that at least this portion is cleaned. For detecting, opto-electronically, holes 9 to 13, the cassette 5 has an opening in the edge 7 past which the tape 8 runs, an opening 14 in the upper side of the cassette and a mirror surface 15 at 45 degrees to the upper side—see FIG. 3. Infra-red radiation from a source above the opening 14 is reflected by the surface 15 towards the tape 8, and a hole in the tape is detectable as a result of radiation passing through that hole. Finally, the cassette 5 also has a cover portion let into the edge 7, the cover portion being pivoted at a corner of the cassette and being such that, when the cassette is inserted into a computer, one of a pair of cassette guides against which the side edges of the cassette run engages with the cover portion to pivot it away from the edge 7 to expose a portion of the tape 8 for read/write purposes. A computer tape cassette of the foregoing type is of well-known construction, and could be, for example, a "Scotch" DC 300 XL tape cassette data cartridge.

Referring again to FIG. 1, the portion 2 of the apparatus 1 has an aperture 16 through its upper side, shaped to enable the insertion of a tape cleaning device 17—see FIGS. 4(a), 4(b) and 4(c). Cleaning device 17 comprises a T-shaped member 18 of plastics material having bonded to its longer limb a foam sponge cleaning pad 19 soaked with Feron. In the longer limb of member 18 there is a through-hole 20 into which a locking pin can be inserted to lock the device 17 in the apparatus 1—see below.

Alongside the aperture 16, the upper side of the portion 2 has a display area for giving visual instructions to a user of the apparatus. The display area comprises an opaque panel 21 having semi-transparent portions as follows:

a semi-transparent delineation 22 of the device 17;
a semi-transparent arrow 23;
a semi-transparent arrow 24;
a semi-transparent arrow 25;
a semi-transparent delineation 26 of the computer tape cassette; and
a semi-transparent arrow 27.

Beneath each of delineation 22, arrows 23, 24 and 25, delineation 26 and arrow 27 there is a respective one of light-emissive diodes 22a, 23a, 24a, 25a, 26a and 27a (see FIG. 8) whereby energisation of a particular one of the diodes illuminates the respective delineation or arrow to provide a visual indication to a user of the apparatus. The diodes 22a to 27a are carried on a circuit board attached on the inner, lower face of the upper side of the portion 2.

Referring to FIGS. 6 and 7, in the portion 3 there is a plate 28 which carries an L-shaped framework 29, in the horizontal limb of which is an infra-red radiation emissive diode 30 and in the upright limb of which is a pair of infra-red radiation detectors 31 and 32, one above the other, the framework 29 carrying a printed circuit board 33 to which is attached a micro-switch 34; a motor 35 let into the plate 28, the shaft of the motor 35 driving a drive roller 36; and a framework 37 which carries a solenoid 38. The framework 37 has an opening 39 shaped to receive the longer limb of the member 18 of a cleaning device 17 when the latter is inserted through the aperture 16, the sides of the longer limb of the member 18 being held by flanges 40 of the framework 37. The framework 37 has a through-hole 41 whereby, when the solenoid 38 is energised, its pin 42 passes through the hole 41 to engage in the hole 20 in the longer limb of member 18 to act as a locking pin to lock the device 17 in the apparatus. Pin 42 is provided with a plate 43 to limit its amount of movement.

The plate 28 is integrally moulded with a pair of cassette guides 44a and 44b. Underneath the plate 28 is a printed circuit board 45.

Referring now to FIG. 8, the apparatus further comprises electronic logic control circuitry 46 (for example based on an appropriately programmed micro-processor) carried by the circuit board 45; a micro-switch 47 carried on the bottom of the portion 3 and having an actuating lever 48; and a buzzer 49 carried by the circuit board 45. The micro-switch 34 is connected with an input 49 of the circuitry 46 and the detectors 31 and 32 are connected to inputs 50 and 51 respectively of the circuitry 46. An output 52 of the circuitry 46 is connected to the motor 35 for controlling it to drive the roller 36 in forward and reverse directions. The micro-switch 47 is connected to an input 53 of the circuitry 46 and an output 54 of the latter is connected to the solenoid 38 for energising and de-energising it. An output 55 of the circuitry 46 is connected to the buzzer 49 for energising the latter and the diodes 22a to 27a are connected to respective ones of outputs 56, 57, 58, 59, 60 and 61 of the circuitry 46 for being energised by the circuitry 46.

Connections from the light-emissive diodes 22a to 27a are effected via a flexible wiring harness between the printed circuit board 45 and the printed circuit board mounted on the lower face of the upper side of the portion 2 and carrying the diodes. Connections from the micro-switch 34, the source 30 and the detectors 31 and 32 to the printed circuit board 45 are effected via the printed circuit board 33 and wiring between the two circuit boards. At the rear of the portion 2, there is means for connecting the apparatus to a source of mains voltage, a mains on-off switch and a mains transformer, the apparatus further including rectifying and smoothing circuitry for providing appropriate operating voltages.

The apparatus is used to clean the tape of computer tape cassette 5 in the following manner.

When the apparatus is switched on, first logic circuitry 46 causes diodes 22a and 23a to be energised via outputs 56 and 57 to illuminate delineation 22 and arrow 23 to inform a user of the apparatus to insert a cleaning device 17. Insertion of device 17 into the framework 37 via the aperture 16 results in device 17 contacting the lever 48 (below the framework 37) to pivot the actuating lever 48 and thereby close the micro-switch 47. Closure of the micro-switch 47 is indicated to the circuitry 46 via input 53, whereupon the circuitry 46 causes the solenoid 38 to be energised via the output 54 whereby the pin 42 is moved to engage in hole 20 of member 18 to lock the cleaning device 17. Also, the circuitry 46 causes the diodes 22a and 23a to be de-energised and the diodes 26a and 27a to be energised (via the outputs 60 and 61) to indicate to a user of the apparatus to insert the computer tape cassette.

The computer tape cassette is inserted via the aperture 4 and is guided by the guides 44a and 44b, latter being shaped to pivot the above-mentioned cover portion of the cassette to expose a portion of the tape. As a result of complete insertion of the computer tape cassette, the left-hand end of edge 7 has contacted and closed micro-switch 34; the opening 14 and surface 15 are directly underneath the source 30 (see FIG. 3); the roller 36 is in contact with the drive capstan of the cassette; and the exposed portion of tape is in contact with pad 19 of device 17. Closure of micro-switch 34 is indicated to circuitry 46 via input 49, whereupon motor 35 is controlled via output 52 to be driven in such a direction that the roller 36 drives the capstan of the cassette so that the tape is driven in a forwards direction. Also, the circuitry 46 causes the diode 27a to be de-energised and only the diode 26a to be energised (to illuminate the delineation 26) to indicate to a user that the tape is being driven.

Figure 3:
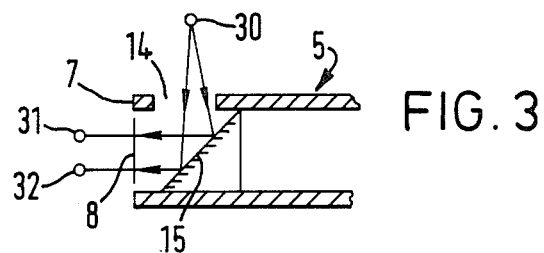
FIG. 3 shows schematically part of a cassette tape.

When one of holes 9, 11 and 12 in the tape 8 passes in front of the surface 15, this is detected by detector 31 detecting reflected radiation through the hole; and when one of holes 10 and 13 in the tape 8 passes in front of the surface 15, this is detected by detector 32 detecting reflected radiation which has passed through the hole—see FIG. 3. To ensure that the usable portion of the tape between holes 9 and 11 is cleaned as a result of the tape being moved past and in contact with the pad 19, the circuitry 46 uses outputs from detectors 31 and 32 on inputs 50 and 51 respectively as a result of detecting holes in the tape in the following manner. With the tape 8 being driven forwards, if a hole at the top of the tape and a hole at the bottom of the tape are detected simultaneously, the circuitry 46 maintains forward driving of the tape; if just a hole at the top of the tape is detected, then the circuitry 46 still maintains forward driving of the tape; whereas if just a hole at the bottom of the tape is detected, circuitry 46 causes motor 35 to be reversed via output 52 so that the tape is driven in a reverse direction. With the tape being driven in a reverse direction, if just a hole at the bottom of the tape is detected, circuitry 46 maintains reverse driving of the tape; if just a hole at the top of the tape is detected, circuitry 46 still maintains reverse driving of the tape; whereas if a hole at the top of the tape and a hole at the bottom of the tape are detected simultaneously, then circuitry 46 de-energises motor 35 via the output 52 to stop driving of the tape. The above sequence of logic operations carried out by the circuitry 46 using outputs from detectors 31 and 32 on inputs 50 and 51 ensures that the usable portion of the tape between holes 9 and 11 is cleaned by causing the tape to be driven forwards until a hole 10 is detected and then driven in a reverse direction and not stopped until a pair of holes 12, 13 is detected, irrespective of the starting position of the tape. If the tape were driven forwards until a hole at the top of the tape is detected and then reversed, this would be unsatisfactory since the hole at the top of the tape could be either hole 9 or hole 11 depending upon the starting position of the tape and the above-described sequence of logic operations overcomes this potential ambiguity.

Substantially simultaneously with causing the motor 35 to be stopped, the circuitry 46 causes diode 27a to be energised (via output 61) as well as diode 26a so that both delineation 26 and arrow 27 are illuminated to provide a visual indication to a user of the apparatus to remove the cassette, the circuitry 46 also energising the buzzer 49 via output 55 to provide an audible indication to a user of the apparatus to remove the cassette. As a result of removal of the cassette from the apparatus, micro-switch 34 is opened and, in response to detecting that micro-switch 34 has opened, circuitry 46 causes solenoid 38 to be de-energised whereby the pin 42 is withdrawn from the hole 20 to unlock the cleaning device 17. Also, the circuitry 46 causes the diodes 26a and 27a to be de-energised and the diodes 22a and 24a to be energised (via outputs 56 and 58) to illuminate delineation 22 and arrow 24 to indicate to a user of the apparatus to remove the cleaning device.

Removal of cleaning device 17 causes micro-switch 47 to open and, as a result of detecting opening of micro-switch 47, circuitry 46 causes the buzzer 49 to be de-energised. Also, circuitry 46 causes diode 24a to be de-energised and diode 23a to be energised (via output 57) so that both delineation 22 and arrow 23 are illuminated to indicate to a user of the apparatus that it is ready for the insertion of a fresh cleaning device 17, the previously used one to be discarded.

Finally, as an additional feature, if the circuitry 46 detects, as a result of closure of micro-switch 34, that a cassette has been inserted but detects that a cleaning device 17 has not been inserted since micro-switch 47 is not closed, then it causes buzzer 49 to be energised via output 55, causes diodes 22a and 23a to be de-energised and causes diodes 26a and 27a to be energised (via outputs 60 and 61) to illuminate delineation 26 and arrow 27, thereby providing audible and visual indications to a user of the apparatus to remove the cassette.

We claim:
1. Apparatus for use in cleaning the tape of a tape cassette, the apparatus comprising:
   (a) a housing;
   (b) an aperture defined by the housing whereby a tape cassette can be inserted into the housing;
   (c) an opening defined by the housing through which a tape cleaning device can be inserted into the housing;
   (d) drive means in the housing for causing the tape of a tape cassette inserted into the housing to be driven past the cleaning device in contact therewith to be cleaned; and
   (e) electronic logic control circuitry in the housing for controlling the drive means in response to insertion of a cleaning device and a tape cassette.

2. Apparatus according to claim 1, wherein the housing includes switch means actuated in response to insertion of a cassette into the housing to cause the control circuitry to actuate and control the drive means.

3. Apparatus according to claim 1, wherein the housing includes means for locking the cleaning device in response to its insertion into the housing.

4. Apparatus according to claim 3, wherein the locking means comprises a solenoid actuated in response to insertion of the cleaning device into the housing.

5. Apparatus according to claim 4, wherein the housing includes switch means actuated in response to insertion of the cleaning device into the housing to actuate the solenoid.

6. Apparatus according to claim 1, wherein the drive means comprises a motor and a drive roller driven by the motor.

7. Apparatus according to claim 1, for use with a tape cassette whose tape has means adjacent opposite ends of the tape for indicating these ends, the apparatus including detecting means connected with the control circuitry for sensing the indicating means, the control circuitry controlling the drive means so that at least the portion of tape between the indicating means is driven past the cleaning device.

8. Apparatus according to claim 7, wherein the detecting means comprises opto-electronic detecting means.

9. Apparatus according to claim 7, for use with a tape cassette in which the indicating means comprises: a first hole in the tape, adjacent one end, and a sequence of holes of a first type between said one end and said first hole; and a second hole in the tape, adjacent the opposite end, and a sequence of holes of a second type between said opposite end and said second hole, the detecting means comprising means for sensing such holes in the tape and the control circuitry controlling the drive means so that the tape is driven in an appropriate direction until a hole in said sequence of a first type is detected, in response to which said drive means drives the tape in the opposite direction until a hole in said sequence of a second type is detected, in response to which the drive means is stopped.

10. Apparatus according to claim 9, wherein the detecting means comprises opto-electronic detecting means.

11. Apparatus for use in cleaning the tape of a tape cassette, the apparatus comprising:
   (a) a housing;
   (b) an aperture defined by the housing whereby a tape cassette can be inserted into the housing;
   (c) an opening defined by the housing through which a tape cleaning device can be inserted into the housing;
   (d) a motor and a drive roller in the housing for causing the tape of a tape cassette inserted into the housing to be driven past the cleaning device in contact therewith to be cleaned;
   (e) electronic logic control circuitry in the housing for controlling the drive means in response to insertion of a cleaning device and a tape cassette;

(f) switch means in the housing, actuated in response to insertion of a cassette into the housing to cause the control circuitry to actuate and control the motor;

(g) means for locking the cleaning device in response to its insertion into the housing, the locking means comprising a solenoid actuated in response to insertion of the cleaning device into the housing and the latter including further switch means, actuated in response to insertion of the cleaning device into the housing to actuate the solenoid; and (h) the apparatus being for use with a tape cassette whose tape has means adjacent opposite ends of the tape for indicating these ends, the apparatus further including opto-electronic detecting means connected with the control circuitry for sensing the indicating means, the control circuitry controlling the motor so that at least the portion of tape between the indicating means is driven past the cleaning device.

12. Apparatus according to claim 11, for use with a tape cassette in which the indicating means comprises: a first hole in the tape, adjacent one end, and a sequence of holes of a first type between said one end and said first hole; and a second hole in the tape, adjacent the opposite end, and a sequence of holes of a second type between said opposite end and said second hole, the detecting means comprising means for sensing such holes in the tape and the control circuitry controlliing the motor so that the tape is driven in an appropriate direction until a hole in said sequence of a first type is detected, in response to which said motor drives the tape in the opposite direction until a hole in said sequence of a second type is detected, in response to which the motor is stopped.

* * * * *

UNITED STATES PATENT AND TRADEMARK OFFICE
CERTIFICATE OF CORRECTION

PATENT NO. : 4,713,857

DATED : December 22, 1987

INVENTOR(S) : Don R. Cecil et al.

It is certified that error appears in the above-identified patent and that said Letters Patent is hereby corrected as shown below:

On the first page of the patent, that portion reading:

Assignee: Pacefault Limited, Gwent, England should read:

Assignee: Pacevault Limited, Gwent, England

Signed and Sealed this

Sixth Day of September, 1988

Attest:

DONALD J. QUIGG

*Attesting Officer*  *Commissioner of Patents and Trademarks*